(12) United States Patent
Heddrich et al.

(10) Patent No.: US 6,889,616 B1
(45) Date of Patent: May 10, 2005

(54) TRACK SUPPORT

(75) Inventors: Rolf Heddrich, Jössnitz (DE);
Hartmut Hoyer, Kemnitz (DE);
Wolfgang Oertel, Plauen (DE)

(73) Assignee: Stahlbau Plauen GmbH, Plauen (DE)

( * ) Notice: Subject to any disclaimer, the term of this patent is extended or adjusted under 35 U.S.C. 154(b) by 42 days.

(21) Appl. No.: 10/030,196

(22) PCT Filed: Jun. 24, 2000

(86) PCT No.: PCT/EP00/05846

§ 371 (c)(1),
(2), (4) Date: May 28, 2002

(87) PCT Pub. No.: WO01/04420

PCT Pub. Date: Jan. 18, 2001

(30) Foreign Application Priority Data

Jul. 7, 1999 (DE) .......................................... 199 31 367

(51) Int. Cl.[7] ................................................ B60L 13/00
(52) U.S. Cl. ..................... 104/292; 104/281; 104/124
(58) Field of Search ................................. 104/124, 126,
104/281, 282, 283, 290, 292, 293, 294,
164, 91, 404; 29/525, 525.1

(56) References Cited

U.S. PATENT DOCUMENTS 4,856,173 A * 8/1989 Maier et al. .................. 29/445
5,131,132 A * 7/1992 Kindmann et al. ........... 29/525
5,365,855 A * 11/1994 Wagner ....................... 104/124
5,850,794 A * 12/1998 Raschbichler et al. ...... 104/281

FOREIGN PATENT DOCUMENTS

| DE | 44 28 376 A | 2/1996 | |
| DE | 197 35 471 C | 1/1999 | |
| DE | 19735471 C1 * | 1/1999 | ........... B60L/13/04 |
| EP | 0 335 088 A | 10/1989 | |

* cited by examiner

Primary Examiner—Frantz F. Jules
(74) Attorney, Agent, or Firm—Norris McLaughlin & Marcus PA

(57) ABSTRACT

A track support for the track of a magnetic levitation railway consists of a steel support having a closed hollow trapezoidal or hollow triangular cross section with closed end faces, whose cover plate projects, in the manner of a jib, with its longitudinal edge sections over the side wall web plates, and at the end of which cover plate a side guidance rail is arranged in each case. In order to keep the surfaces of the track support that are exposed to environmental influences as small as possible, a stator support web plate is arranged on the underside of each jib, between the ground-side end section of which plate and the adjacent side wall web plate and the adjacent side guidance rail horizontal plates are arranged, forming closed cavities, where two parallel web flanges between which the grooved cross members are screwed are provided per jib on the underside of the plates.

9 Claims, 5 Drawing Sheets

TRACK SUPPORT

The invention relates to a track support for the track of a magnetic levitation railway, consisting of a steel support, which is preferably fully welded in a fully automatic manner and has a closed hollow trapezoidal or hollow triangular cross section with closed end faces, the cover plate of which support, forming the upper chord, projects laterally, in the manner of a jib, with its longitudinal edge sections over the web plates, which form the side walls and which converge at an angle from the underside of the cover plate to the mid-vertical plane of the track support, and to each end of which cover plate a side guidance rail is attached.

BACKGROUND OF THE INVENTION

The magnetic levitation railway is a track-guided transport system with non-contact levitation, guidance and propulsion technology. The levitation and guidance system works on the principle of electromagnetic levitation, which is based on the attractive forces between the levitation magnets of the underbody of the vehicle and the ferromagnetic reaction rails, the so-called stator packs, which are installed beneath the track. The levitation magnets attract the vehicle to the track from beneath, and the guidance magnets installed at the side hold the vehicle laterally in the track. The levitation and guidance magnets are arranged over the entire length of the vehicle on both sides. The essential element of this technology comprises the track supports forming the track, which take on the functions of support, guidance and levitation of the vehicle and transmit the loads via the main supporting framework to the bearings; from there, the loads are passed to the ground via the substructures and the foundations.

The torsionally rigid steel track supports, which are generally fully welded in a fully automatic manner and have a hollow triangular or hollow trapezoidal cross section with closed end faces, for the track of a magnetic levitation railway, consisting of a cover plate with a thickness of from 15 to 25 mm, which forms the upper chord and to which the web plates having a thickness of from 10 to 20 mm, which form the side walls and which converge at an angle to the mid-vertical plane of the track support, are connected in a downward direction. In the case of the track support with a hollow triangular cross section, the lower chord consists of a tube, and in the case of the track support having a hollow trapezoidal cross section, the lower chord consists of a base plate with a thickness of from 30 to 50 mm. The longitudinal edge sections of the cover plate, which project over each of the side wall web plates in the manner of a jib, are stiffened by cross-supports or bulkheads installed at intervals and at the same time serve to connect the functional components corresponding to the levitation and guidance system of the vehicle, essentially consisting of stator packs with cable windings and the guidance rails, which are connected via anchoring supports to double-T supports attached to the jibs (ref.: Eisenbahntechnische Rundschau, ETR 33, 1984, issue 6, pp. 487 to 492, in particular pp. 488/89).

Based on this prior art, DE-C-19735471 discloses a track support in which the side guidance rails are mounted directly at the ends of the cover plate jibs projecting over the lateral side wall web plates. The stator packs with a length of about 1 m, which consist of plastic-bonded and encapsulated electric steel plates are arranged on both sides of the track support beneath the jibs along the entire track. Via three grooved cross members, which are bonded in an interlocking manner in the jib-facing side of each stator pack, these stator packs are attached, in each case by means of two bolts, to the stator support chord, which is connected to the stator support web, which is arranged on the underside of the jib and runs parallel to the mid-vertical plane of the track support. The grooved cross members and the grooves accommodating these in the stator support chord form a redundant attachment in addition to the bolt.

Since the function and operational strength of the track supports forming the track must be guaranteed for the service life of at least 80 years, all surfaces of the track support have to be automatically blasted and cleaned in accordance with DIN 55928, Part 4, with a standard cleanliness of SA 2½ or greater by means of one or more freely programmable handling devices. A primer coat of zinc dust and three further coats of iron mica are subsequently applied to the surfaces prepared in this way by means of one or more freely programmable handling devices. In order to meet the requirement for a service life of 80 years, maintenance and inspection, where necessary together with repair work of the track, is necessary at regular intervals.

SUMMARY OF THE INVENTION

The object of the present invention is to keep the surfaces of the track support described at the outset which are exposed to environmental influences as small as possible with optimized use of materials and to simplify and qualitatively improve the attachment of the stators.

BRIEF DESCRIPTION OF THE DRAWINGS

The invention is explained in greater detail below by means of illustrative embodiments, in which.

DETAILED DESCRIPTION

Figure 1:
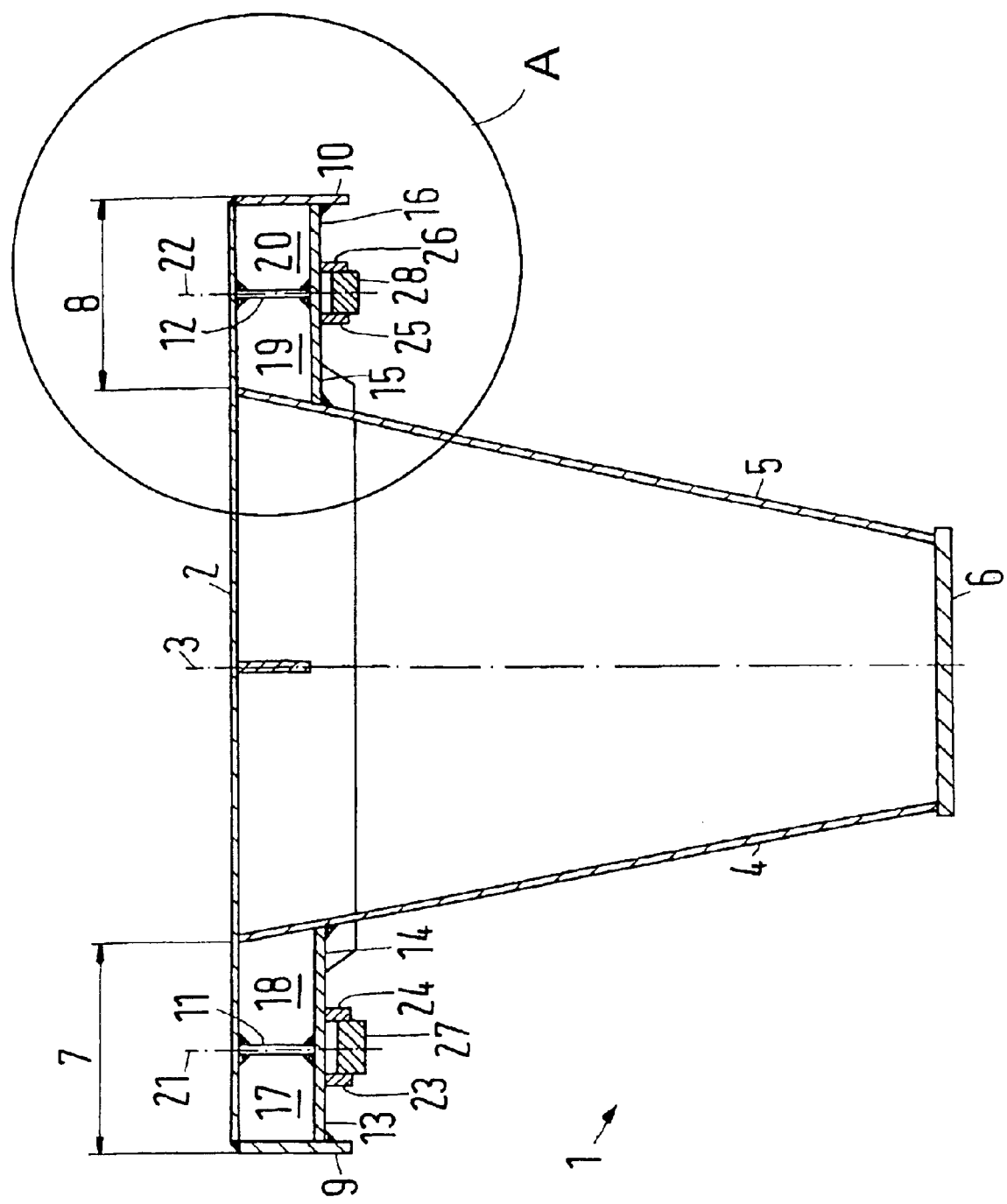
FIG. 1 shows a cross section through a track support.

The torsionally rigid steel track support (1), which is fully welded in a fully automatic manner and which has a closed hollow trapezoidal cross section, consists of a cover plate (2), which forms the upper chord, the web plates (4, 5), which form the side walls, are mounted on the underside of the cover plate (2) and converge at an angle to the mid-vertical plane (3) of the track support (1), and the base plate (6), which is connected to the web plates at the bottom and forms the lower chord. The longitudinal edge sections of the cover plate (2) project laterally over the web plates (4, 5) in the manner of a jib (7, 8) and carry at their ends in each case a side guidance rail (9, 10). A stator support web plate (11, 12), which runs parallel to the mid-vertical plane (3) of the track support (1), is mounted on the underside of each jib (7, 8) beneath the set-down zone of the jib (7, 8), and horizontal plates (13, 14, 15, 16), by means of which the cavities (17, 18, 19, 20) are closed on the ground side, are arranged between the end of the web plate on the ground side and the adjacent side wall web plate (4, 5) on the one hand and the adjacent side guidance rail (9, 10) on the other hand. Two web flanges (23, 24, 25, 26), which run parallel to the vertical load plane (21, 22) passing through the set-down zone and at the same distance from the vertical load plane, and between which the stator packs (27, 28) are attached, are located on the underside of each plate (13, 14, 15, 16). The stator packs (27, 28) are provided with three cross grooves on the jib side, into each of which a grooved cross member (29) is inserted and connected to the web flanges (25, 26) in a frictional and interlocking manner by means of a high-strength bolt (30, 31). The bolts (30, 31) inserted through corresponding holes (32, 33) in the web flange (25, 26) are screwed in the through holes (34), running perpendicular to the web flanges (25, 26), with internal thread of the grooved cross members (29). A redundant attachment of the grooved cross members (29) takes place through fixing pins (35, 36), which are arranged above the bolts (30, 31) in the vertical plane including the latter, are pressed into the holes (37) (38) located in the web flanges (25, 26) and project into the blind holes (41, 42) located in the grooved cross member with formation of an annular space (39, 40). As additional security against the falling-out of fixing pins (35, 36) which may have been loosened, washers (43) (44) are installed beneath each of the heads of the bolts (30, 31) and cover a segment of the holes (37, 38) located in the web flanges (25, 26) for the fixing pins (35, 36). In the event of both bolts (30, 31) failing, the stator pack accordingly drops by about 2 mm until the fixing pins (35, 36) are locked in the blind holes (41, 40).

Figure 4:
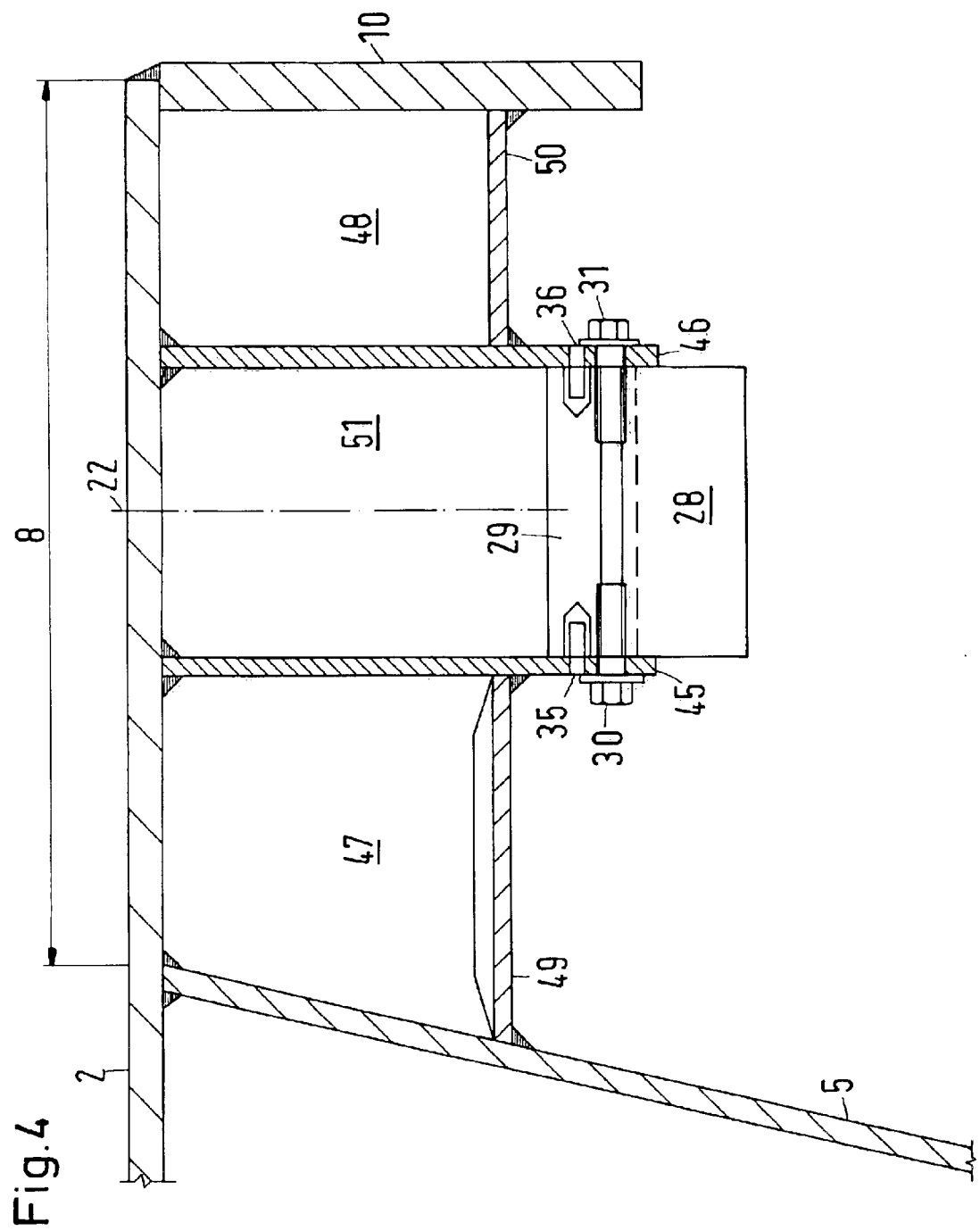
FIG. 4 shows an alternative enlarged partial section "A" of the track support design modified as compared with FIG. 2 in the region of the jib.

A modification of the above-described fitting of the track support (1) consists, according to FIG. 4, of two stator support web plates (45, 46) attached to the underside of each jib (7, 8) and running parallel at a distance from one another and from the mid-vertical plane (3) of the track support (1), between the ground-side end sections of which plates, which are screwed in an interlocking and frictional manner, as shown above in detail, to the grooved cross members (29), which are inserted into the jib-side cross grooves of the stator packs (27, 28) and support the latter. The cavities (47) (48) present between the side wall web plates (5) and the respectively adjacent stator support web plate (45) on the one hand and the side guidance rails (10) and the respectively adjacent stator support web plate (46) are closed on the ground side by plates (49, 50) attached to the mid-vertical plane (3) of the track support (1). It is not shown in the drawing that the cavity (51) present between the stator support web plates (45, 46) above the grooved cross members (29) can also be closed by attachment of a corresponding plate.

Figure 2:
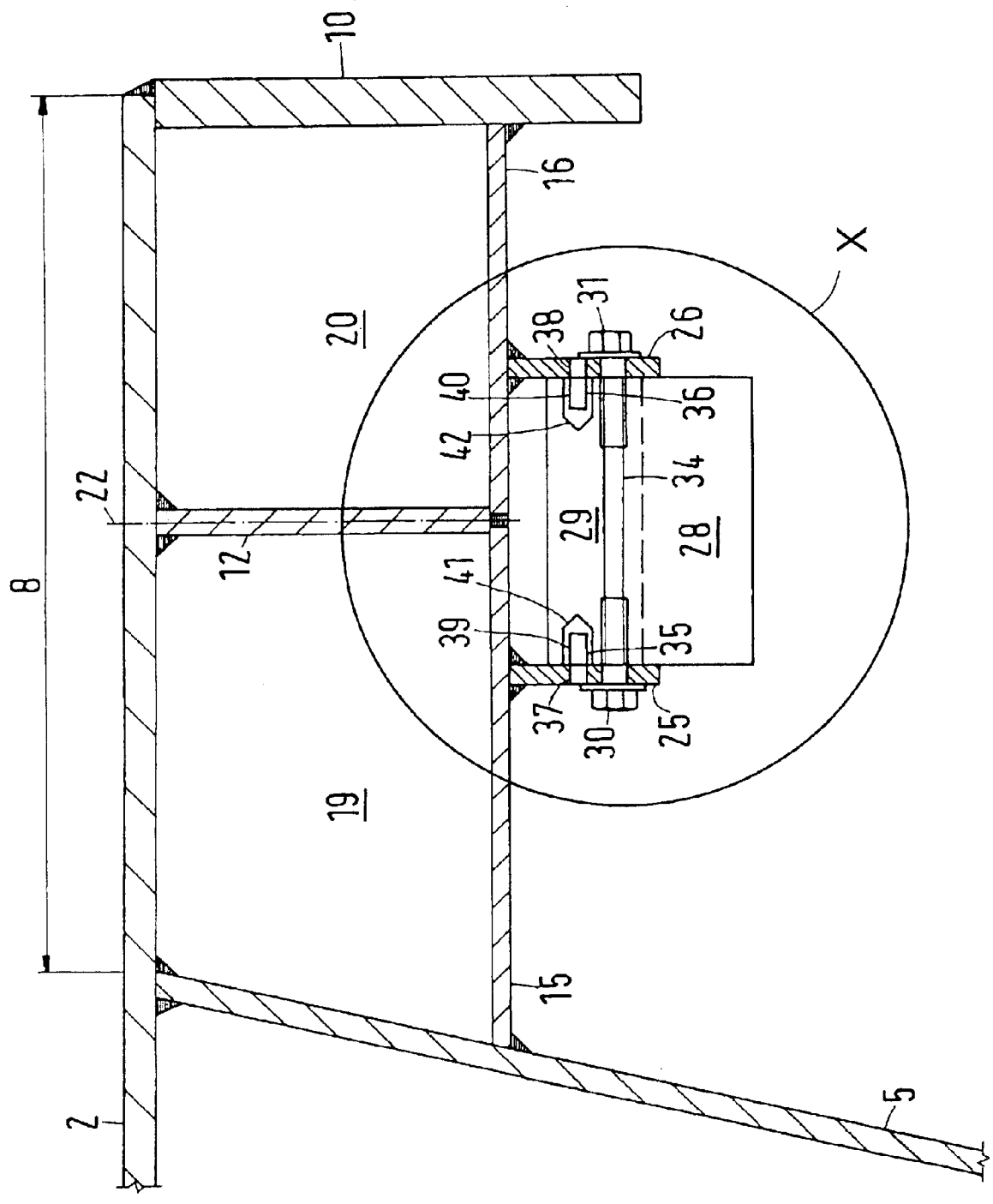
FIG. 2 shows an enlarged partial section "A" of the track support design in the region of the jib shown in FIG. 1
Figure 3:
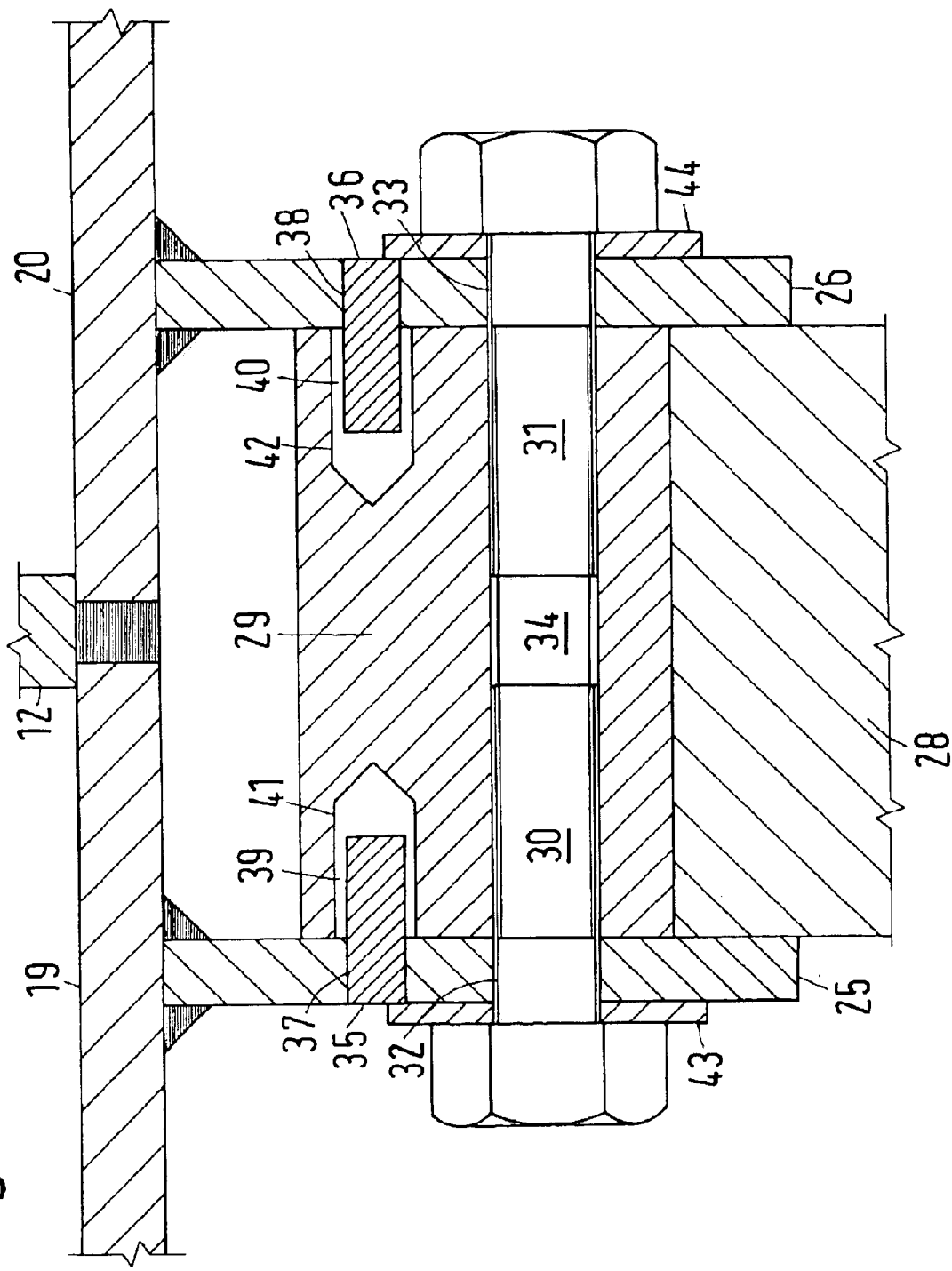
FIG. 3 shows an enlarged depiction of detail X in FIG. 2
Figure 5:
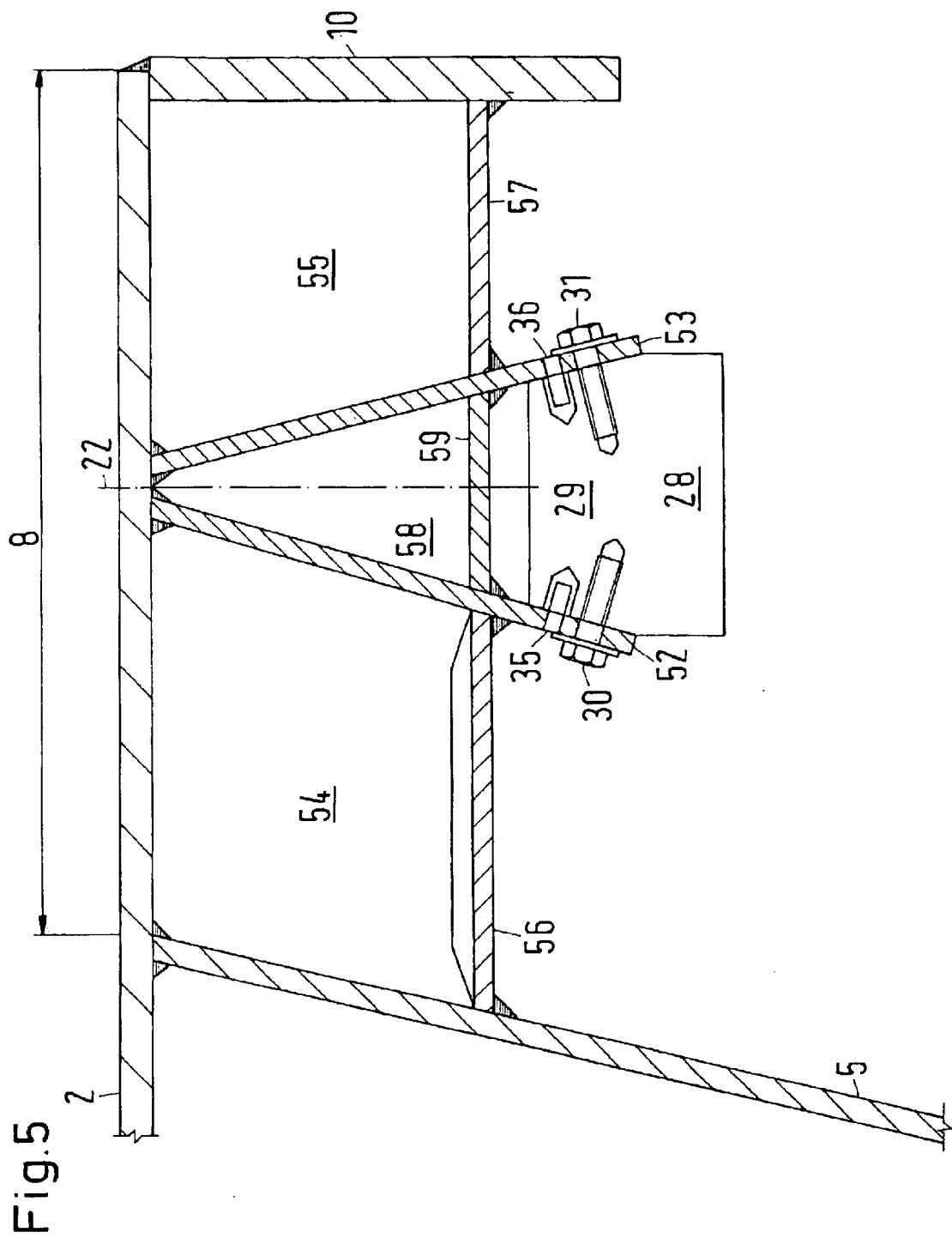
FIG. 5 shows a further alternative enlarged partial section "A" of the track support design modified as compared with FIG. 2 in the region of the jib.

A further modification of the embodiment shown in FIG. 1 to FIG. 3 of the fitting of the track support (1) consists, as shown in FIG. 5, in that two stator support web plates (52, 53) are attached to the underside of each jib (7, 8) in the region beneath the set-down zone and form an angle of 15° to the mid-vertical load plane (22) running through the set-down zone and the grooved cross members (29), which are inserted into the jib-side cross grooves of the stator packs (27, 28) and support the latter, are screwed in an interlocking and frictional manner between the ground-side end sections of these plates. In accordance with the angle of the two stator support web plates (52, 53) formed with the mid-vertical load plane (22), the front faces of the grooved cross members (29) are inclined at an angle of 75°. The cavities (54, 55) present between the web plates (4, 5) and the respectively adjacent stator support web plates (52) on the one hand, and the side guidance rails (9, 10) and the respectively adjacent stator support web plates (53) on the other hand are closed on the ground side by plates (56, 57) attached perpendicularly to the mid-vertical plane (3) of the track support (1). The cavity (58) enclosed by the two stator support web plates (52, 53) is closed by a plate (59) attached above the grooved cross members (29).

The advantages achieved by means of the device according to the invention are to be regarded, in particular, as being that, with optimized use of materials, the surfaces of the track support which are relatively difficult to access are not subject to environmental influences. The qualitatively better attachment of the stators is possible with significantly less effort.

What is claimed is:

1. A track support for support of the track of a magnetic levitation railway, comprising a steel support in the shape of an inverted trapezoid, having sides formed of side wall web plates, an upper base formed by a cover plate, which cover plate has a top side and an underside, and a lower base formed of a base plate, the side wall web plates being mounted to the underside of the cover plate and converging at an angle towards and being connected to the base plate, the cover plate projecting laterally over and extending from each side wall to form cantilever arms extending from each side, said cantilever arms each having an upper side and an underside, with a stator support web plate projecting approximately perpendicularly from the underside of each cantilever arm, at approximately the middle thereof and a side guidance rail projecting approximately perpendicularly from the underside of each cantilever arm at the end thereof, a plate being arranged between the end of the stator support web plate and the side wall web plate adjacent to it the stator support web plate and between the end of the stator support web plate and the side guidance rail adjacent to it the stator support web plate, the so arranged plates having an upper side and an underside, a pair of web flanges projecting from the undersides of the so arranged plates beneath each of said cantilevers and being parallel to and equidistant from an imaginary extension of said stator support webs, a stator pack being supported between each of said pair of web flanges.

2. The track support of claim 1, wherein the web flanges of each pair each have a first hole adapted to accommodate a bolt passing therethrough and a second hole adapted to accommodate a fixing pin, and the stator pack has cross grooves on one side thereof into which a grooved cross member is inserted, and said stator packs are supported between said flanges by securing said cross members between each of said pairs of flanges by bolts inserted through said first holes and screwed into internal threads in said cross members and by fixing pins pressed into and through said second holes and into blind holes in said cross members, said pins having a cross-section sufficiently less than the cross-sections of said blind holes to result in an annular space between said pins and said blind holes.

3. The track support of claim 2, further comprising washers beneath the heads of said bolts.

4. A track support for support of the track of a magnetic levitation railway, comprising a steel support in the shape of an inverted trapezoid, having sides formed of side wall web plates, an upper base formed by a cover plate, which cover plate has a top side and an underside, and a lower base formed of a base plate, the side wall web plates being mounted to the underside of the cover plate and converging at an angle towards and being connected to the base plate, the cover plate projecting laterally over and extending from each side wall to form cantilever arms extending from each side, said cantilever arms each having an upper side and an underside, and a side guidance rail projecting approximately perpendicularly from the underside of each cantilever arm at the end thereof, with a pair of stator support web plates projecting approximately perpendicularly from the underside of each cantilever arm, a horizontal support plate connecting each side wall web plate to the stator support web plate closest to it, and a another horizontal support plate connecting each side guidance rail to the stator support web plate closest to it, a stator pack being supported between each of said pair of stator support web plates.

5. The track support of claim 4, wherein the stator support web plates of each pair each have a first hole adapted to accommodate a bolt passing therethrough and a second hole adapted to accommodate a fixing pin, and the stator pack has cross grooves on one side thereof into which a grooved cross member is inserted, and said stator packs are supported between said stator support web plates by securing said cross members between each of said pairs of stator support web plates by bolts inserted through said first holes and screwed into internal threads in said cross members and by fixing pins pressed into and through said second holes and into blind holes in said cross members, said pins having a cross-section sufficiently less than the cross-sections of said blind holes to result in an annular space between said pins and said blind holes.

6. The track support of claim 5 further comprising washers beneath the heads of said bolts.

7. A track support for support of the track of a magnetic levitation railway, consisting of a steel support in the shape of an inverted trapezoid, having sides formed of side wall web plates, an upper base formed by a cover plate, which cover plate has a top side and an underside, and a lower base formed of a base plate, the side wall web plates being mounted to the underside of the cover plate and converging at an angle towards and being connected to the base plat the cover plate projecting laterally over and extending from each side wall to form cantilever arms extending from each side, said cantilever arms each having an upper side and an underside, and a side guidance rail projecting approximately perpendicularly from the underside of each cantilever arm at the end thereof, with a pair of stator support web plates projecting from the underside of each cantilever arm, at approximately the middle thereof, and diverging away from each other at an acute angle of from 15 to 30° along their projecting lengths, a horizontal support plate connecting each of said diverging stator support web plates to each other, at a distance from said cantilever arms, a support plate connecting each side wall web plate to the stator support web plate closest to it, and a support plate connecting each side guidance rail to the stator support web plate closest to it, a stator pack being supported between each of said pair of stator support web plates.

8. The track support of claim 7, wherein the stator support web plates of each pair each have a first hole adapted to accommodate a bolt passing therethrough and a second hole adapted to accommodate a fixing pin, and the stator pack has cross grooves on one side thereof into which a grooved cross member is inserted, and said stator packs are supported between said stator support web plates by securing said cross members between each of said pairs of stator support web plates by bolts inserted through said first holes and screwed into internal threads in said cross members and by fixing pins pressed into and through said second holes and into blind holes in said cross members, said pins having a cross-section sufficiently less than the cross-sections of said blind holes to result in an annular space between said pins and said blind holes.

9. The track support of claim 8, further comprising washers beneath the heads of said bolts.

\* \* \* \* \*